J. D. DAVIS.
PROCESS OF OXIDIZING PHOSPHIN AND APPARATUS THEREFOR.
APPLICATION FILED AUG. 19, 1918.

1,325,145.

Patented Dec. 16, 1919.

Inventor:
Joseph D. Davis
By C. D. Scheffler
Attorney.

UNITED STATES PATENT OFFICE.

JOSEPH D. DAVIS, OF WASHINGTON, DISTRICT OF COLUMBIA.

PROCESS OF OXIDIZING PHOSPHIN AND APPARATUS THEREFOR.

1,325,145.  Specification of Letters Patent.  Patented Dec. 16, 1919.

Application filed August 19, 1918. Serial No. 250,591.

(FILED UNDER THE ACT OF MARCH 3, 1883, 22 STAT. L., 625.)

*To all whom it may concern:*

Be it known that I, JOSEPH D. DAVIS, a citizen of the United States, and a resident of Washington, in the District of Columbia, and an employee of the United States Bureau of Mines, at Washington, have invented certain new and useful Improvements in Process of Oxidizing Phosphin and Apparatus Therefor, of which the following is a specification.

This application is made under the act of March 3, 1883, chapter 143 (22 Stat., 625) and the invention herein described and claimed may be used by the Government of the United States or any of its officers or employees in the prosecution of work for the United States, or by any other person in the United States, without the payment of any royalty thereon.

This invention relates to an improved process of removing phosphin from gas mixtures in which its presence is undesirable and includes certain novel apparatus in which the improved process may be carried out.

Phosphin is generated by the contact of water with many electric-furnace products, which, being made from impure materials and under reducing conditions contain the easily decomposed metal phosphids. Thus commercial calcium carbid always contains phosphid, the latter producing phosphin when the carbid is decomposed to form acetylene. When calcium and similar carbids are "nitrified" to produce the corresponding cyanamid salts, phosphid is found as an impurity in the nitrified product. If the cyanamid is decomposed in the usual way with water or steam to produce ammonia, phosphin forms at this stage and contaminates the ammonia. In one very important series of reactions for fixing atmospheric nitrogen, calcium cyanamid is hydrolyzed as mentioned above and the resulting ammonia is burned with air in the presence of a catalyst to form nitric acid. It is in this latter step that phosphin exerts one of its most detrimental actions, for the catalysts commonly employed are platinum, palladium, and similar metals and their alloys and phosphorus compounds have a highly injurious effect on these metals at elevated temperatures. The activity of the catalysts is so much impaired that the presence of a very few parts of phosphin per million parts of ammonia-air mixture passing over the catalyst will soon produce a large falling off in the efficiency of the oxidation. It is primarily in connection with this process that I have considered the applicability of my invention, but it will be understood that the invention is in nowise limited to the removal of phosphin from ammonia or ammonia-containing mixtures, the removal of phosphin from acetylene and other gases being also contemplated.

I have discovered that whereas ammonia when mixed with air or oxygen may be oxidized to oxids of nitrogen and water when brought into contact with a suitable catalyst at a red heat, phosphin, when similarly mixed with air may be quantitatively oxidized at ordinary temperatures provided a suitable catalyst is used. The phosphorus pentoxid and water formed on oxidizing phosphin immediately combine to form phosphoric acid. As a catalyst for the oxidation of phosphin, I preferably employ charcoal.

One form of apparatus adapted for use in carrying out my improved process is shown in the drawings in which,—

Figure 1:
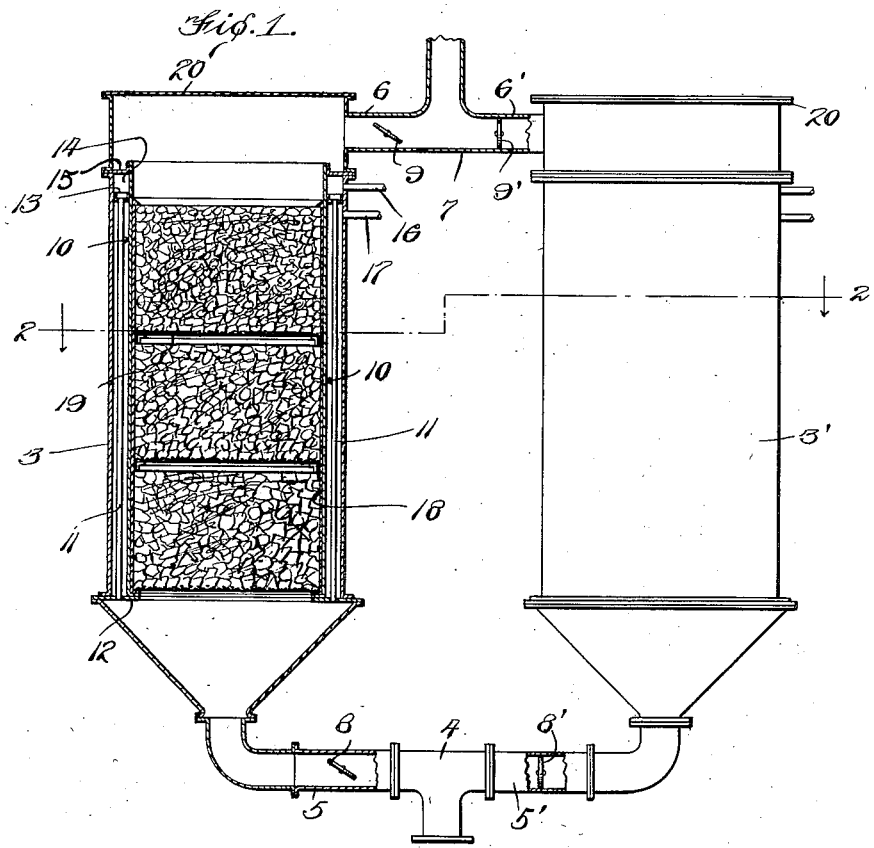
Figure 1 is a side elevation, partly in section of the apparatus.
Figure 2:
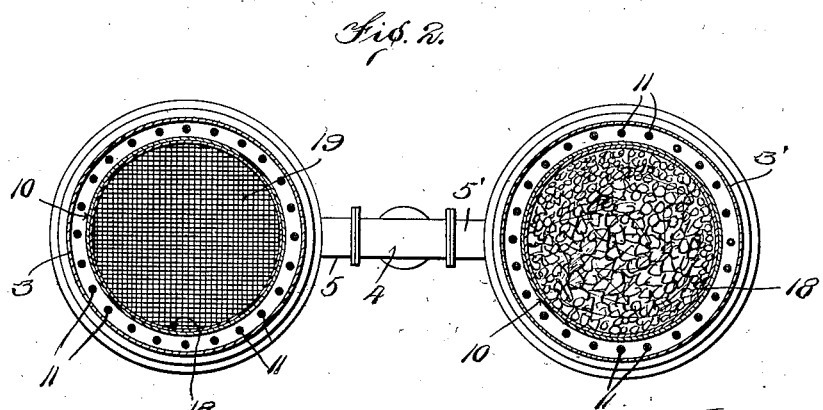
Fig. 2 is a section along line 2—2 of Fig. 1.

The drawing will be described with reference to the process as applied to the removal of phosphin from an ammonia-air mixture but it is obviously not limited to this use.

The drawings show two catalytic chambers, 3 and 3' arranged in parallel in the line from the ammonia-air mixing apparatus to the oxidizer. These chambers are exactly the same and are connected with the gas supply through the T 4 and piping 5, 5' and to the oxidizer through the piping 6, 6' and the T 7 so that they may be used alternately, the gas stream being shunted to the other chamber when it is desired to throw one of them out of operation, for example, to revivify or replace the catalyst. The valves 8, 8' and 9, 9' operate in an obvious manner to isolate the desired chamber.

Referring now to chamber 3, it will be seen that its main portion is cylindrical while the lower end is conical. An inner wall 10 is arranged concentrically with the cylindrical portion to form a space into which steam may be injected for a purpose hereafter described. Passing lengthwise through the space are a series of tubes 11, terminating below in the header plate 12 which shuts off the steam jacket from the interior of the chamber. The upper ends of the tubes pass through the upper header plate 13 into the annular manifold 14 formed by plates 13 and 10, the outer wall of the chamber 3 and the annular plate 15. An inlet for air under pressure is provided at 16 while steam may be admitted to the steam jacket through pipe 17. A drain-cock not shown, is provided at the bottom of the steam jacket.

Surrounded by the steam-jacket is the removable open-ended cylinder 18 resting on a ledge formed by the projecting header-plate 12. This cylinder contains the catalyst which rests upon a series of supports 19 of permeable material, such as metal screens, to keep the catalyst from packing by its own weight. A removable cover plate 20 permits the cylinder 18 and its contents to be lifted from the cylinder 3 by means of a crane.

The operation of the apparatus in the process described is as follows:

The cylinder 18, being filled with charcoal in an active condition, such as that produced by ignition is lowered into place in the chamber 3 and the cover plate 20 secured in place. The valves 8 and 9 are then opened and valves 8' and 9' are closed. The ammonia-air mixture flowing through the system is diverted to the chamber 3 and the charcoal therein rapidly absorbs ammonia until it reaches equilibrium with the gas current. In the meantime the mixture is flowing through the catalyst to the oxidizer. Any phosphin present is oxidized to phosphoric acid and this combines with ammonia to form ammonium phosphate which is deposited and held in the catalyst so that the gases entering the oxidizer contain no phosphorous compounds. While the chamber 3 is in use, the catalyst in chamber 3' is revivified or replaced and the chamber 3' closed with its cover-plate.

When the catalyst in chamber 3 has become clogged with phosphorus compounds to such an extent as to be sluggish in action, the gas current is again diverted to the chamber 3'. At this time the valves 8' and 9' are opened and valve 8 is closed. The valve 9 is left open until the ammonia absorbed in the catalyst in chamber 3 is recovered, ammonia being held in large amount when the catalyst is composed of charcoal. To expel the ammonia, steam is admitted to the steam jacket through pipe 17 until the catalyst is thoroughly heated. At the same time or later, air is blown in through pipe 16, manifold 14, and tubes 11. The air is heated as it passes through the tubes 11 and since valve 8 is closed, the hot air is forced up through the catalyst, thereby rapidly removing the ammonia from it. This ammonia joins the main current at the T 7 and passses to the oxidizer.

When all the ammonia has been expelled the air and steam are cut off and valve 9 is closed. The cover plate 20 is then removed and the cylinder 18 removed bodily from chamber 3.

To revivify charcoal when it is used as a catalyst, it is only necessary to thoroughly wash it and then dry it and these operations may be performed without removing it from the cylinder 18.

I have also discovered that the catalytic properties of charcoal and the like are considerably improved when these substances are coated or impregnated with metals or metal compounds, for example, silver or silver nitrate. Suitable metals so used promote the action of the charcoal, and I find their presence to be particularly advantageous when using charcoal of inferior grade which is necessary in some cases due to the high cost of the more active varieties. In activating charcoal by the use of metal compounds, I prefer to treat it with a solution of the desired compound, for example a solution of a metal nitrate. The charcoal is then dried. If preferred, the metal compound may be wholly or partially reduced by igniting it in an atmosphere of hydrogen. The activity of the catalyst is found to be enhanced, whether reduction is effected or not. It will, therefore, be understood that where I use the term "metal-containing substance" in the claims, I intend to include the metal itself. The use and revivification of the metal activated catalyst is similar to that of the inactivated kind.

What I claim is:

1. A process of oxidizing phosphin which comprises bringing a gas mixture containing phosphin and oxygen into contact with a catalyst.

2. A process of oxidizing phosphin which comprises bringing a gas mixture containing phosphin and oxygen into contact with a carbonaceous catalyst.

3. A process of oxidizing phosphin which comprises bringing a gas mixture containing phosphin and oxygen into contact with a catalyst at normal atmospheric temperature.

4. A process of oxidizing phosphin which comprises bringing a gas mixture containing phosphin and oxygen into contact with charcoal.

5. A process of oxidizing phosphin which comprises bringing a gas mixture containing phosphin and oxygen into contact with charcoal at normal atmospheric temperature.

6. A process of removing phosphin from gas mixtures containing oxygen which comprises selectively oxidizing the phosphin and absorbing the oxidation products.

7. A process of removing phosphin from gas mixtures containing oxygen and oxidizable substances other than phosphin,, which comprises oxidizing the phosphin and removing the oxidation products without affecting the other oxidizable constituents.

8. A process of removing phosphin from gas mixtures containing ammonia and oxygen which comprises oxidizing the phosphin and removing the oxidation products without affecting the ammonia.

9. A process of removing phosphin from gas mixtures containing ammonia and oxygen which comprises catalytically oxidizing the phosphin and removing the oxidation products without affecting the ammonia.

10. A process of removing phosphin from gas mixtures containing ammonia and oxygen which comprises oxidizing the phosphin in the presence of a carbonaceous catalyst and removing the oxidation products without affecting the ammonia.

11. A process of removing phosphin from gas mixtures containing ammonia and oxygen which comprises oxidizing the phosphin in the presence of charcoal and removing the oxidation products without affecting the ammonia.

12. A process of removing phosphin from gas mixtures containing ammonia and oxygen which comprises catalytically oxidizing the phosphin at normal atmospheric temperature and removing the oxidation products without affecting the ammonia.

13. A process of removing phosphin from gas mixtures containing ammonia and oxygen which comprises oxidizing the phosphin at normal atmospheric temperature and removing the oxidation products without affecting the ammonia.

14. A process of removing phosphin from gas mixtures containing ammonia and oxygen which comprises oxidizing the phosphin in the presence of charcoal at normal atmospheric temperature, and removing the oxidation products without affecting the ammonia.

15. A method of regenerating a catalyst used in the oxidation of phosphin which comprises washing said catalyst to remove the oxidation products contained therein and then drying said catalyst.

16. An apparatus for removing phosphin from gases which comprises a chamber containing a catalyst capable of selectively oxidizing phosphin, a steam jacket around said chamber, a plurality of tubes passing through said steam jacket each communicating at one end with the space containing said catalyst and at the other end with a source of supply of compressed air.

17. A process of oxidizing phosphin which comprises bringing a gas mixture containing phosphin and oxygen into contact with a carbonaceous catalyst impregnated with a silver-containing substance.

18. A process of oxidizing phosphin which comprises bringing a gas mixture containing phosphin and oxygen into contact with charcoal and a promoter.

19. A process of oxidizing phosphin at normal atmospheric temperature, which comprises bringing a gas mixture containing phosphin and oxygen into contact with charcoal impregnated with a metal compound.

20. A process of removing phosphin from gas mixtures containing ammonia and oxygen which comprises oxidizing the phosphin in the presence of charcoal associated with a metal containing substance and removing the oxidation products without affecting the ammonia.

21. A process of removing phosphin from gas mixtures containing ammonia and oxygen which comprises oxidizing the phosphin in the presence of metal activated charcoal at normal atmospheric temperature and removing oxidation products without affecting the ammonia.

In testimony whereof I affix my signature.

JOSEPH D. DAVIS.